United States Patent
Locatelli et al.

(10) Patent No.: US 7,989,510 B2
(45) Date of Patent: Aug. 2, 2011

(54) PROCESS FOR THE PURIFICATION OF AN AQUEOUS STREAM COMING FROM THE FISCHER-TROPSCH REACTION

(75) Inventors: Lino Locatelli, Vigevano (IT); Gabriele Clerici, Milan (IT); Franca Pisani, legal representative, Vigevano (IT)

(73) Assignee: ENI S.p.A., Rome (IT)

( * ) Notice: Subject to any disclaimer, the term of this patent is extended or adjusted under 35 U.S.C. 154(b) by 0 days.

(21) Appl. No.: 12/863,309

(22) PCT Filed: Jan. 14, 2009

(86) PCT No.: PCT/EP2009/000389
§ 371 (c)(1),
(2), (4) Date: Oct. 12, 2010

(87) PCT Pub. No.: WO2009/090104
PCT Pub. Date: Jul. 23, 2009

(65) Prior Publication Data
US 2011/0021645 A1    Jan. 27, 2011

(30) Foreign Application Priority Data
Jan. 18, 2008    (IT) .............................. MI2008A0079

(51) Int. Cl.
C07C 27/00    (2006.01)
B01D 35/18    (2006.01)

(52) U.S. Cl. ......... 518/700; 518/728; 210/175; 210/180

(58) Field of Classification Search .................. 518/700, 518/728; 210/175, 180
See application file for complete search history.

(56) References Cited

U.S. PATENT DOCUMENTS

| | | | |
|---|---|---|---|
| 6,462,097 | B1 | 10/2002 | Martino et al. |
| 6,887,908 | B1 | 5/2005 | Pruet |
| 2003/0125396 | A1 | 7/2003 | Espinoza et al. |
| 2005/0131085 | A1 | 6/2005 | Kohler et al. |

FOREIGN PATENT DOCUMENTS

| | | |
|---|---|---|
| GB | 647 903 | 12/1950 |
| WO | 03 048272 | 6/2003 |

*Primary Examiner* — Jafar Parsa
(74) *Attorney, Agent, or Firm* — Oblon, Spivak, McClelland, Maier & Neustadt, L.L.P.

(57) ABSTRACT

The present invention relates to a process for the purification of an aqueous stream coming from the Fischer-Tropsch reaction which comprises: feeding the aqueous stream containing organic by products of the reaction to a fractionating distillation column or to a stripping column; —condensation of the vaporized stream leaving the head of the column and the removal of a distillate enriched in the heaviest by-products; —feeding the partially purified aqueous stream leaving the bottom of the distillation column, at the head to one or more sensible contact exchangers; —sending a process gas in countercurrent to the tail of the exchanger at a temperature lower than that of the aqueous stream; —sending the process gas enriched in water and part of the residual organic product leaving the head of the exchanger to the Fischer-Tropsch synthesis plant of hydrocarbons; —sending the purified colder water leaving the exchanger directly to further treatment.

12 Claims, 6 Drawing Sheets

PROCESS FOR THE PURIFICATION OF AN AQUEOUS STREAM COMING FROM THE FISCHER-TROPSCH REACTION

The present invention relates to a process for the purification of an aqueous stream coming from the Fischer-Tropsch reaction.

More specifically, the invention relates to a process for the purification of an aqueous stream coming from the Fischer-Tropsch reaction which is based on a system comprising a distillation column and one or more sensible contact exchangers.

The Fischer-Tropsch technology for preparing hydrocarbons from mixtures of gases based on hydrogen and carbon monoxide, conventionally known as synthesis gas, is known in scientific literature. A summary of the main works on the Fischer-Tropsch synthesis is contained in the Bureau of Mines Bulletin, 544 (1955) entitled "Bibliography of the Fischer-Tropsch Synthesis and Related Processes" H. C. Anderson, J. L. Wiley e A. Newell.

The Fischer-Tropsch technology is generally based on the use of slurry reactors, reactors which are adopted in chemical reactions which take place in three-phase systems where a gaseous phase is bubbled into a suspension of a solid in a liquid. The gaseous phase consists of synthesis gas, with an $H_2/CO$ molar ratio ranging from 1 to 3, the dispersing liquid phase, at a high temperature, represents the reaction product, i.e. linear hydrocarbons mainly with a high number of carbon atoms and the solid phase is represented by the catalyst.

The synthesis gas preferably comes from steam reforming and/or partial oxidation of natural gas or other hydrocarbons, on the basis of the reactions described, for example, in the U.S. Pat. No. 5,645,613.

Alternatively, the synthesis gas can come from other production techniques as users of high purity oxygen streams or enriched air, such as for example, by autothermal reforming, from C.P.O. (Catalytic Partial Oxidation) or the gasification of coal, or other carbonaceous products, with high-temperature water vapour, as described in "Catalysis Science and Technology", vol. 1, Springer-Verlag, New York, 1981.

The process for the production of liquid hydrocarbons with the Fischer-Tropsch reaction generates an amount, by weight, of water which is greater than the total amount produced of hydrocarbons, following the production of a mole of water for each mole of CO converted into hydrocarbons.

Two phases are substantially produced by the reaction, a lighter phase, in vapour phase, essentially consisting of a blend of hydrocarbons, with from 1 to 25 carbon atoms and a boiling point at atmospheric pressure, for the $C_5$-$C_{25}$ fraction, equal to or lower than about 150° C. and reaction by-products, such as water vapour, ethers or alcohols.

The second phase produced essentially consists of paraffin waxes, liquid at the reaction temperature, comprising blends of saturated linear hydrocarbons, with a high number of carbon atoms. These are generally hydrocarbon mixtures having a boiling point, at atmospheric pressure, higher than 150° C., for example from 160 to 380° C.

The Fischer-Tropsch reaction is carried out at temperatures equal to or higher than 150° C., for example ranging from 200 to 350° C., maintaining a pressure ranging from 0.5 to 20 MPa inside the reactor.

The heavier liquid phase, discharged from the side of the synthesis reactor, contains the catalyst in suspension. Any cobalt-based catalyst capable of being active in the Fischer-Tropsch reaction can be used in the process, object of the present invention.

The lighter phase, in vapour phase, together with the non-reacted reaction gas, is cooled in order to condense and separate the hydrocarbons from the water generated by the reaction and by the other by-products.

The operation is effected in common phase separators for liquids, after which there can remain traces of organic phase dispersed in the water. They can cause the formation of foam in the applications downstream and consequently a complete elimination of the dispersed organic compounds is effected with the help of coalescence filters (US 2004/0262199 A1 Sasol).

Rainwater or other service water present in the production site can be added to the process water.

The aqueous stream obtained, however, contains various polluting substances, also corrosive, due to the solubility of the organic compounds in water and it cannot be totally discharged and/or reused within the process without further purifications.

The pollutants consist of alcohols, acids, ketones, aldehydes and hydrocarbons in varying quantities: the concentration of alcohols can vary from 0.5 to 5% by weight, the acid concentration from 0.05 to 1.5%, and that of the hydrocarbons from 0.001 to 0.1%.

The amount of compounds present, within each group, decreases with an increase in the molecular weight, and compounds up to 25 carbon atoms are included.

The treatment systems of this water normally envisage vaporization operations of part of the water effected by means of additional gaseous streams such as natural gas, water vapour or air in stripping columns (U.S. Pat. No. 5,053,581 Exxon) or effected inside distillation apparatuses equipped with a reboiler (U.S. Pat. No. 6,225,358 B1 Syntroleum, U.S. Pat. No. 0,262,199 A1 Sasol) and with or without reflux.

Systems which envisage the combination of the two methods (Syntroleum U.S. Pat. No. 6,225,358) are also used. These operations are based on the fact that when alcohols, hydrocarbons, ketones and aldehydes are present in small quantities in water, they do not at all have an ideal behaviour, they are more volatile than the water itself and are concentrated at the head of the stripping and distillation equipment and in this way are separated from the main aqueous stream in which organic acids mainly remain.

Another possible water treatment consists in treatment with activated carbons or other adsorbing solids, such as for example, clays or zeolites, to eliminate the organic compounds, possibly preceded by distillation which concentrates alcohols, hydrocarbons, aldehydes and ketones in the distillate as described in US patent 2002/6,462,097 B1 IFP-Agip Petroli-ENI.

A process has now been found for the purification of water coming from the Fischer-Tropsch reaction based on a system comprising a distillation column and one or more sensible contact exchangers which allows the organic compounds to be effectively separated from the water and, at the same time, to remove heat from the same stream.

In accordance with this, an object of the present invention relates to a process for the purification of an aqueous stream coming from the Fischer-Tropsch reaction which comprises:

feeding the aqueous stream containing organic by-products of the reaction to a fractionating distillation column or to a stripping column;

condensation of the vaporized stream leaving the head of the column and the removal of a distillate enriched in the high-boiling by-products;

feeding the partially purified aqueous stream leaving the bottom of the distillation column, at the head to one or more sensible contact exchangers;

sending a process gas in countercurrent to the tail of the exchanger at a temperature lower than that of the aqueous stream;

sending the process gas enriched in water and part of the residual organic product leaving the head of the exchanger to the Fischer-Tropsch synthesis plant of hydrocarbons;

sending the purified colder water leaving the exchanger directly to further treatment.

The process gas entering at a lower temperature with respect to the aqueous stream, removes heat and is also enriched, in water and part of the residual organic product. This action can also possibly exert a washing action of the gas introduced.

In order to further improve the efficacy of the cooling, two or more sensible contact heat exchange units (or groups of units) can be adopted, using the gases present in the process as cooling fluid. For example, either the natural gas or the oxidizing agent ($O_2$) which will be subsequently mixed with the gas stream as primary process reagent, can be used as cooling fluids.

The sensible contact heat exchange units can be arranged in series, in parallel or also have a mixed configuration between connections either in series or parallel.

The process of the invention thus allows an aqueous stream enriched in high-boiling organic compounds to be obtained together with a purified and colder aqueous stream which does not require the use of other cooling units before being sent to a step working at lower temperatures.

In practice, the process of the invention envisages that the water coming from the Fischer-Tropsch reaction containing various polluting substances, be first suitably separated from the hydrocarbon compounds and subsequently sent to a fractionating distillation column or to a stripping column whose function is to lighten the stream to a content of oxygenated organic compounds lower than 10,000 ppm, preferably around 5,000-1,000 ppm of organic residue at the bottom of the column.

Most of these organic compounds consist of acids in an amount of 90-95%, the remaining amount being compounds having a lower oxidation degree.

After treatment in the distillation column or in the stripper, working at a higher, equal or atmospheric pressure, and preferably under atmospheric conditions, the water leaving the bottom of the column is close to its boiling point and, depending on the case, it can be usefully sent to an appropriately deep well in contact with the impeller of a pump suitably immersed and placed in a flooded suction position at the bottom of the same well. In this way the gravitational action of the overlying water column is exploited, preventing, in the case of an atmospheric or subatmospheric column, harmful cavitation phenomena in the suction of the pump, which is necessary for exerting the required pressure on the treated water at the inlet of the subsequent unit working under pressure.

The pressurized pretreated water is sent at the head to an apparatus, consisting of a sensible contact exchanger, which is analogous to a filling column in order to favour its heat exchange, between the water itself and a pressurized process gas sent in countercurrent to the tail of the same apparatus.

Various types of sensible contact exchangers can be used, such as for example, those described in "Application of direct contact heat exchangers to geothermal power production cycles-Project Review, Dec. 1, 1974-May 31, 1977, Mechanical Engineering, University of Utah, Salt Lake City, Utah.

The filling of the exchangers can be of the non-structured or random type, structured or channeled and spray type (see Rif. [3] Process Heat Transfert Donald Q. Kern McGraw-HILL BooK Company, Inc. NY in the chapter "Direct contact Transfer: Cooling Tower". The height of the bed varies with a variation in the type of filling used and consequently from its hydraulic characteristics. Fillings can be used with the widest range of geometries provided the bed has sufficiently high Liquid Load values for allowing a high passage on the part of the descending stream. The materials in this case can be greatly differents, however, the characteristics relating to the chemical aggressiveness of the mixture, must be taken into account: plastic materials seem to be excellent substitutes of metal alloys (as an example) or of ceramic or glass materials, also bearing in mind their reduced weight. The temperature, in our case, does not represent a limit for their use if plastic materials resistant to the sterilization temperature are used.

The gas leaves the head of the equipment and is sent to the hydrocarbon synthesis plant.

The gaseous stream, entering at a lower temperature with respect to the aqueous stream, removes the heat from the same stream and is also enriched in water and part of the organic residue. This action can possibly also exert a washing action of the gas introduced. In the case of the use of natural gas, the separation of an amount of its possible contaminants soluble in an aqueous and acid environment, can be assumed, and in particular the separation of a fraction of the $CO_2$ possibly present in the gas.

The aqueous stream can enter into contact with other process streams such as for example, high purity oxygen pressurized and in the liquid or gaseous state, coming from a cryogenic separation train, before being sent as oxidizing agent of natural gas in a subsequent synthesis gas generation section, or put in contact with streams of nitrogen, or air provided these are also at a lower temperature than that of the water.

The water leaving the sensible contact exchanger is much colder and therefore suitable for being sent directly to subsequent physical or biological treatment. Furthermore, if treated with the oxygen process stream, this water also has a content of dissolved oxygen which is favourable for possible aerobic biological treatment applied thereto.

The advantage of using sensible contact heat exchange units consists in the pressurization of the same with respect to the surrounding environment, and also in the fact of reducing or eliminating the use of cooling towers or other cooling units conventionally used in analogous processes before treatment steps working at a lower temperature. In addition, there is, on the one hand, the washing action of the gas and on the other, a reasonable further stripping action of organic compound which is recycled to the preparation process of the synthesis gas, in the case of contact with oxygen or natural gas.

A further advantage of sensible contact exchangers lies in the possibility of additionally cooling the fluids envisaging in these a partial expansion of the gas introduced.

This enables the temperature of the fluid at the inlet to be further reduced to temperatures lower than the inlet temperature of the gas itself.

In this case, the expanding gas does not come into direct contact with the aqueous stream coming from the Fischer-Tropsch reaction but with a cooling fluid which can consist of desalted water, raw water or auxiliary water.

The cooling fluid is then used for cooling the aqueous stream using a further exchanger which connects the two circuits.

The gases which can be introduced into the exchanger for expansion are those present in the process or other gases such as for example $N_2$ which, in this way, are not contaminated by the polluting agents contained in the aqueous stream.

This further variant of the process is illustrated in the schemes of FIGS. 4, 5 and 6.

It can be noted that the sensible contact exchanger which does not work in direct contact with the aqueous stream to be cooled can be arranged by coupling it with sensible contact exchangers which work in direct contact with said stream or with traditional contact exchangers with indirect contact.

Figure 1:
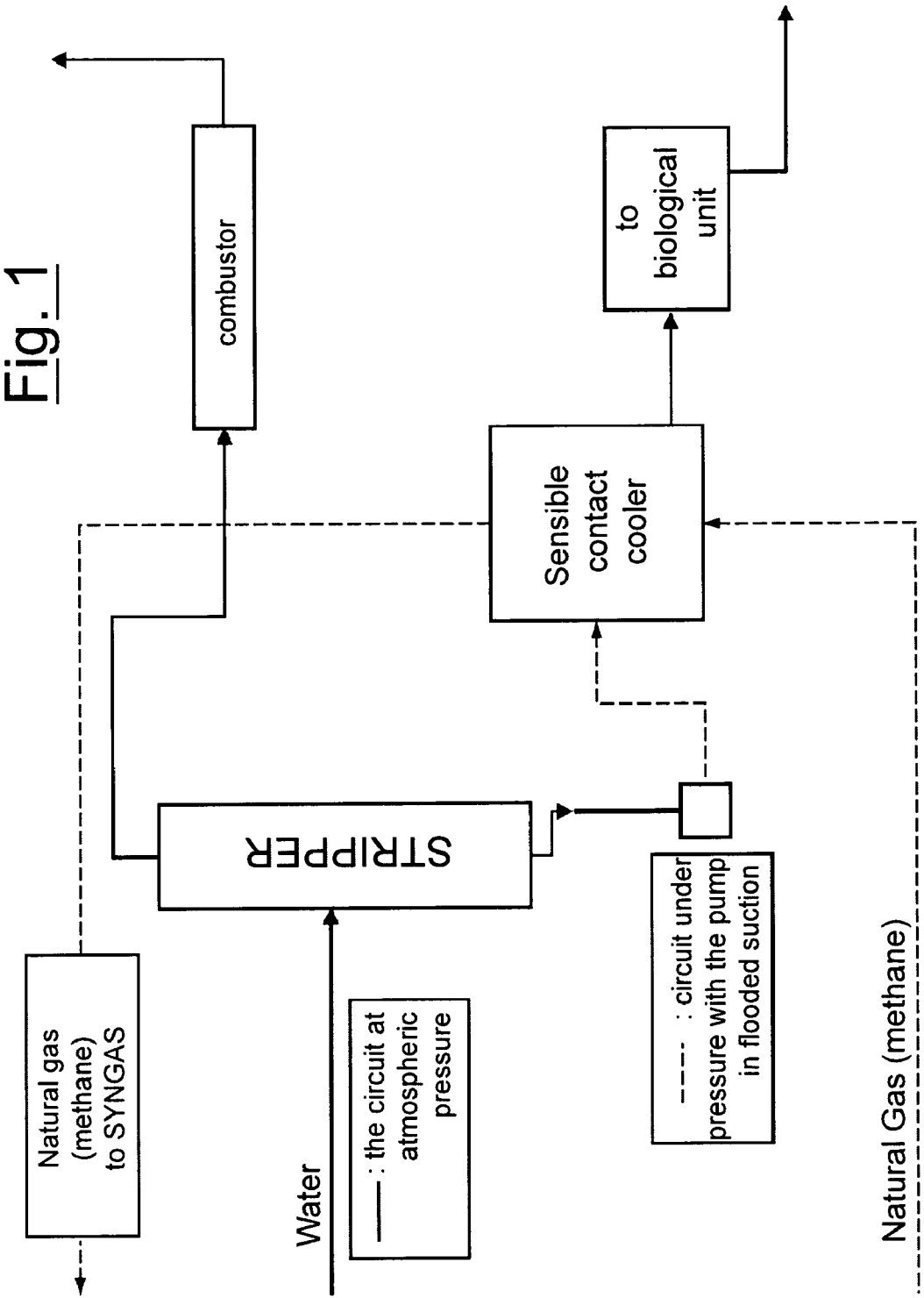
FIG. 1 shows a plant scheme with a sensible contact heat exchange unit.

Plant Scheme with a Sensible Contact Heat Exchange Unit (FIG. 1)

The process water (1) coming from the hydrocarbon separation unit is sent to a rectification column which lightens the same from the oxygenated organic compounds concentrating them at the head (2) whereas at the tail (3) the same contains organic acids with a percentage higher than 90% of the total organic compounds. In our case, the column works at atmospheric pressure and therefore discharges the stream of acid water at a temperature close to boiling point in the well (4) having a depth equal to the piezometric height required so that the gaseous fraction guarantees a suction NPSH adequate for the drastic reduction in the cavitation phenomena. The water under the head is resent (5) under pressure through a pumping system to the sensible contact heat exchange unit (6). The exchanger (6) consists, in our case, of a filling vessel equipped with a bed having a suitable height equal to a number of equilibrium thermodynamic steps not lower than 3, in our case the optimum value is considered as being 5.

The filling can be of the non-structured or random type or of the structured or channeled and spray type (see Rif. [3] Process Heat Transfert Donald Q. Kern McGraw-HILL BooK Company, Inc. NY in the chapter "Direct contact Transfer: Cooling Tower".

The function of the filling is to considerably increase the contact surface between the rising gas, in countercurrent, and the descending liquid, in our case water.

The height of the bed varies with a variation in the type of filling used and consequently from its hydraulic characteristics. Fillings can be used with the widest range of geometries provided the bed has sufficiently high Liquid Load values for allowing a high passage on the part of the descending stream. The materials in this case can be greatly differents, however, the characteristics relating to the chemical aggressiveness of the mixture, must be taken into account: plastic materials seem to be excellent substitutes of metal alloys (as an example) or of ceramic or glass materials, also bearing in mind their reduced weight. The temperature, in our case, does not represent a limit for their use if plastic materials resistant to the sterilization temperature are used.

A gaseous stream, for example natural gas, passes through such equipment, which in its ascent subtracts heat from the acid solution in turn being heated. Its temperature at the outlet of this equipment is lower than or equal to the temperature of the water in the feeding, and preferably ranges from 70-80° C.

Under the process conditions, on the contrary, the water leaving said equipment is normally at temperatures higher than 20° C. and preferably from 30 to 45° C. When natural gas is used, in the passage of the liquid stream, it is impoverished of chemical substances soluble or with a greater affinity with the liquid, such as for example an amount of methanol, glycol and $CO_2$ possibly present, becoming enriched in an organic fraction, and in water vapour. The acid water present at the tail of the contact exchanger further reduces its presence of organic compounds and has a sufficient temperature for drastically reducing the thermal energy necessary for further cooling. At the end, the water can be optionally sent as such to subsequent physico-chemical and/or biological treatment (9).

Figure 2:
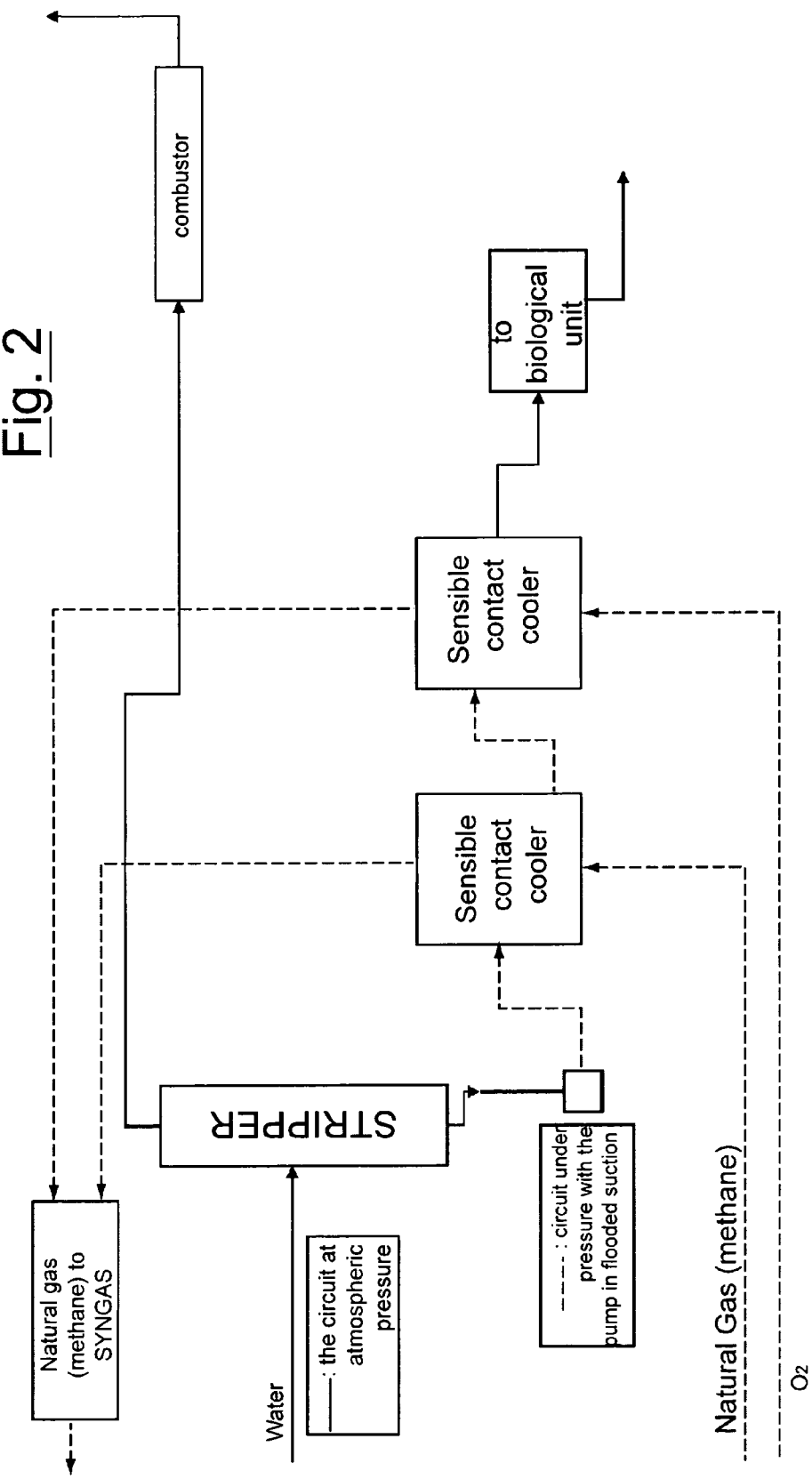
FIG. 2 shows a plant scheme with two or more sensible contact heat exchange units in series.

Plant Scheme with Two or More Sensible Contact Heat Exchange Units in Series (FIG. 2)

In order to further improve the effectiveness of the cooling, two or more sensible contact heat exchange units (or groups of units) can be adopted, using the gases present in the process as cooling fluid. For example, either the natural gas or the oxidizing agent ($O_2$) which will be subsequently mixed with the gas stream as primary process reagent, can be used as cooling fluids. Like the previous scheme, the water coming from the first exchanger is pushed under pressure into a second exchanger (8) through which the oxygen stream passes in turn heating it and yielding to it a portion of methane gas dissolved therein and substituting it with oxygen of the aqueous stream. Also in this case, the above considerations on the type of filling apply, with further attention to the use of materials which show good resistance to oxidizing agents in the co-presence of acid waters. The temperature of the water reaches values close to 35-32° C. The presence of dissolved oxygen, moreover, should favour biological treatment (9) of the aerobic type.

Figure 3:
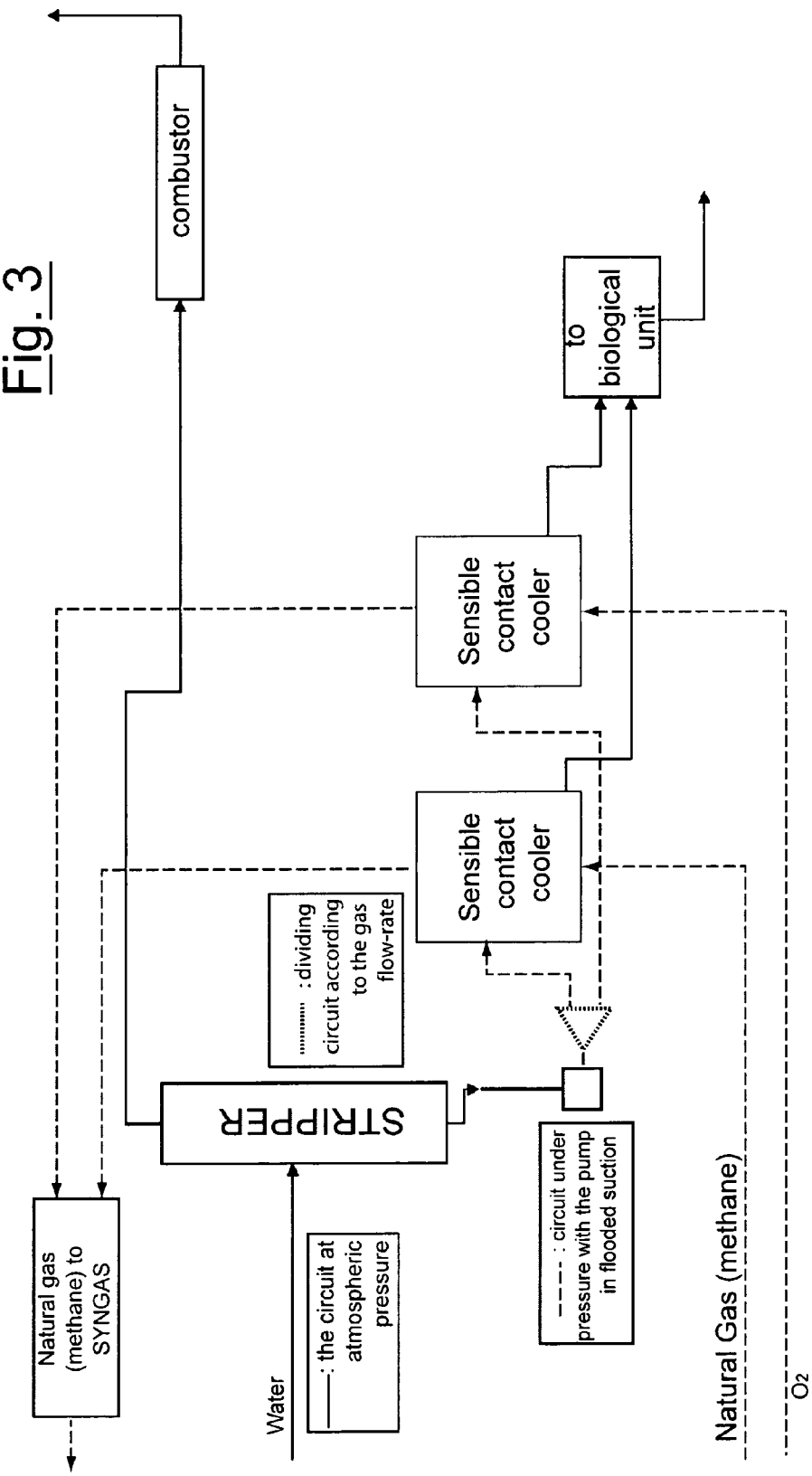
FIG. 3 shows a plant scheme with two or more sensible contact heat exchange units in parallel.
Figure 4:
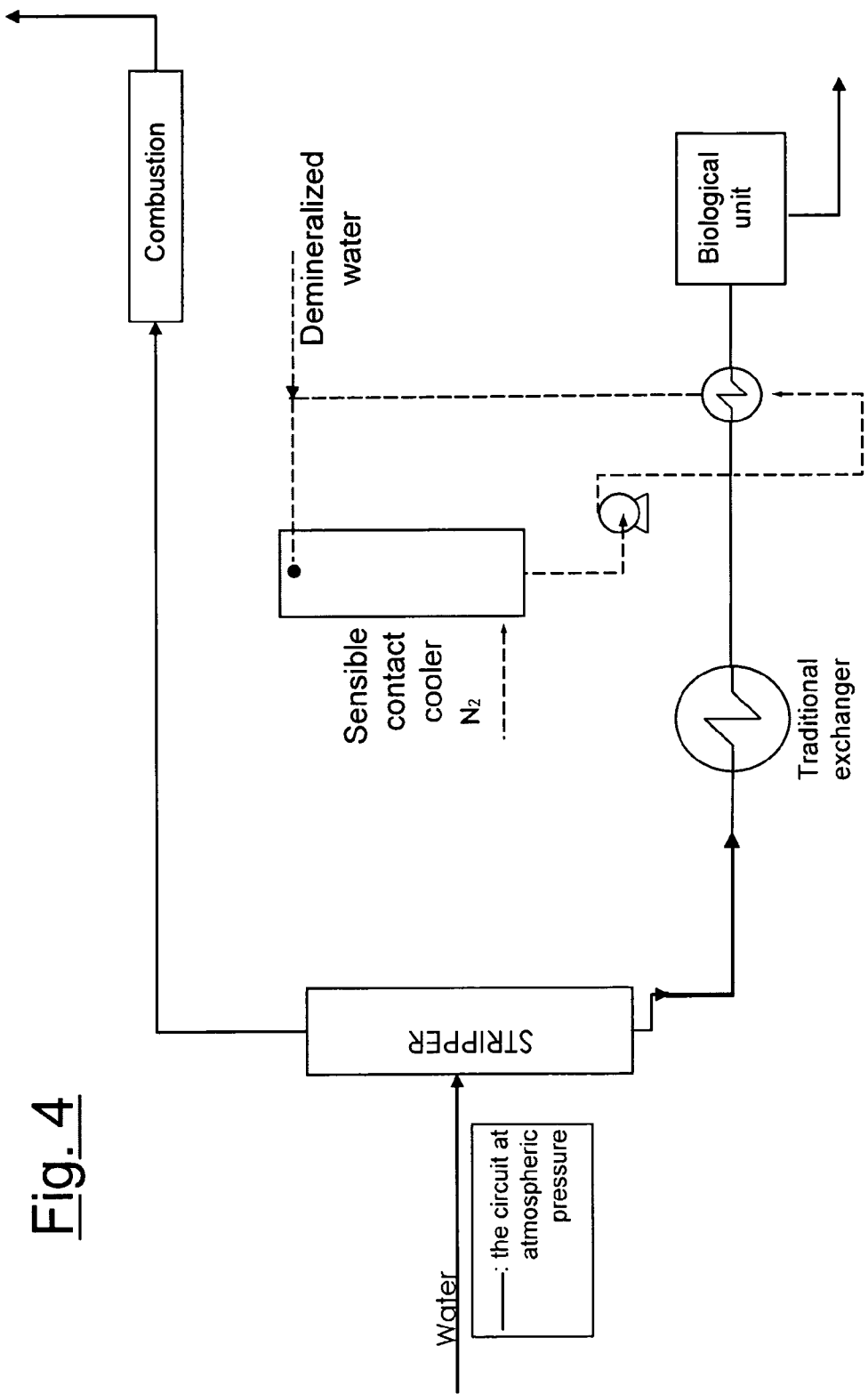
FIG. 4 shows a variant of a plant scheme with a sensible contact heat exchange unit.
Figure 5:
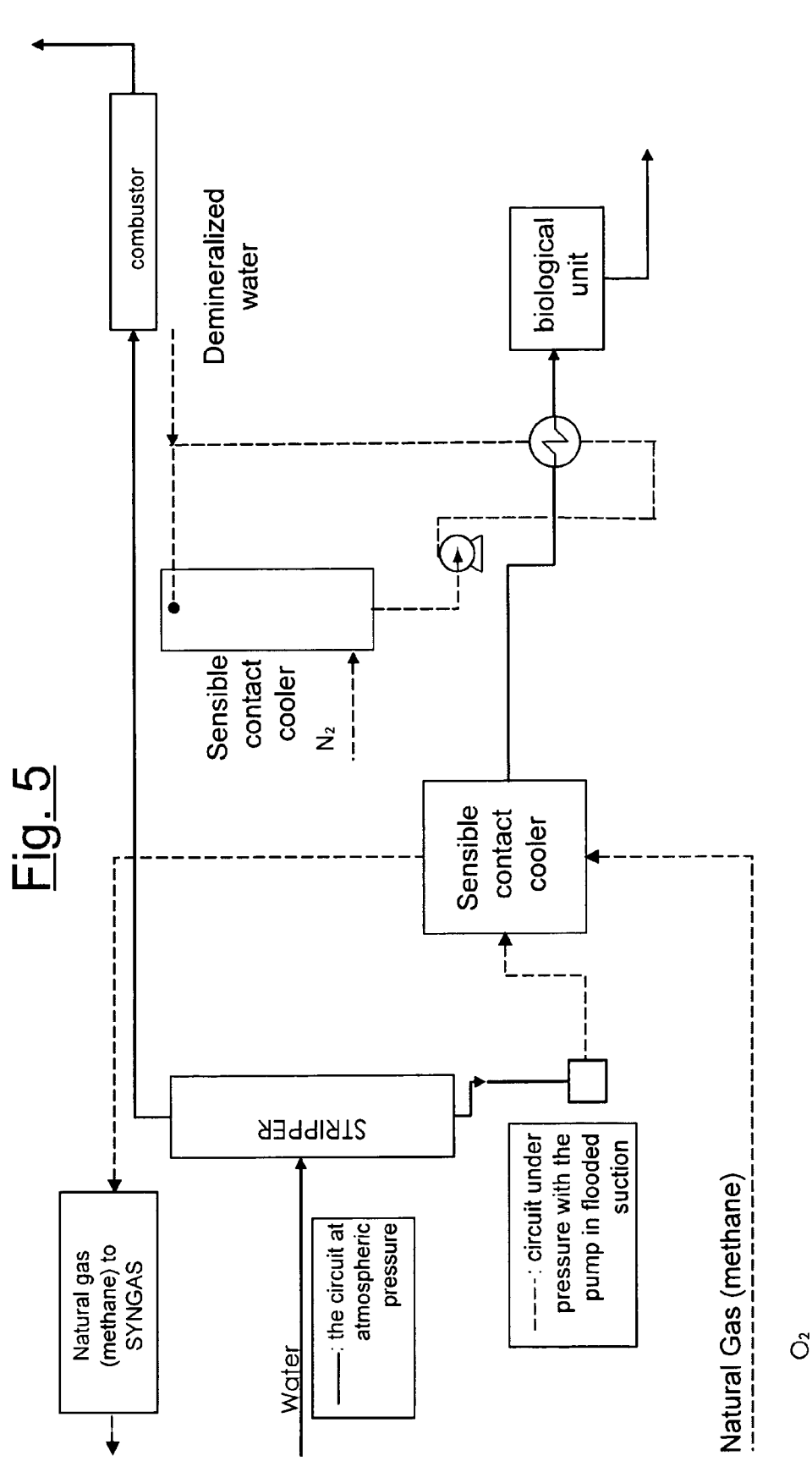
FIG. 5 shows a variant of a plant scheme with two or more sensible contact heat exchange units.
Figure 6:
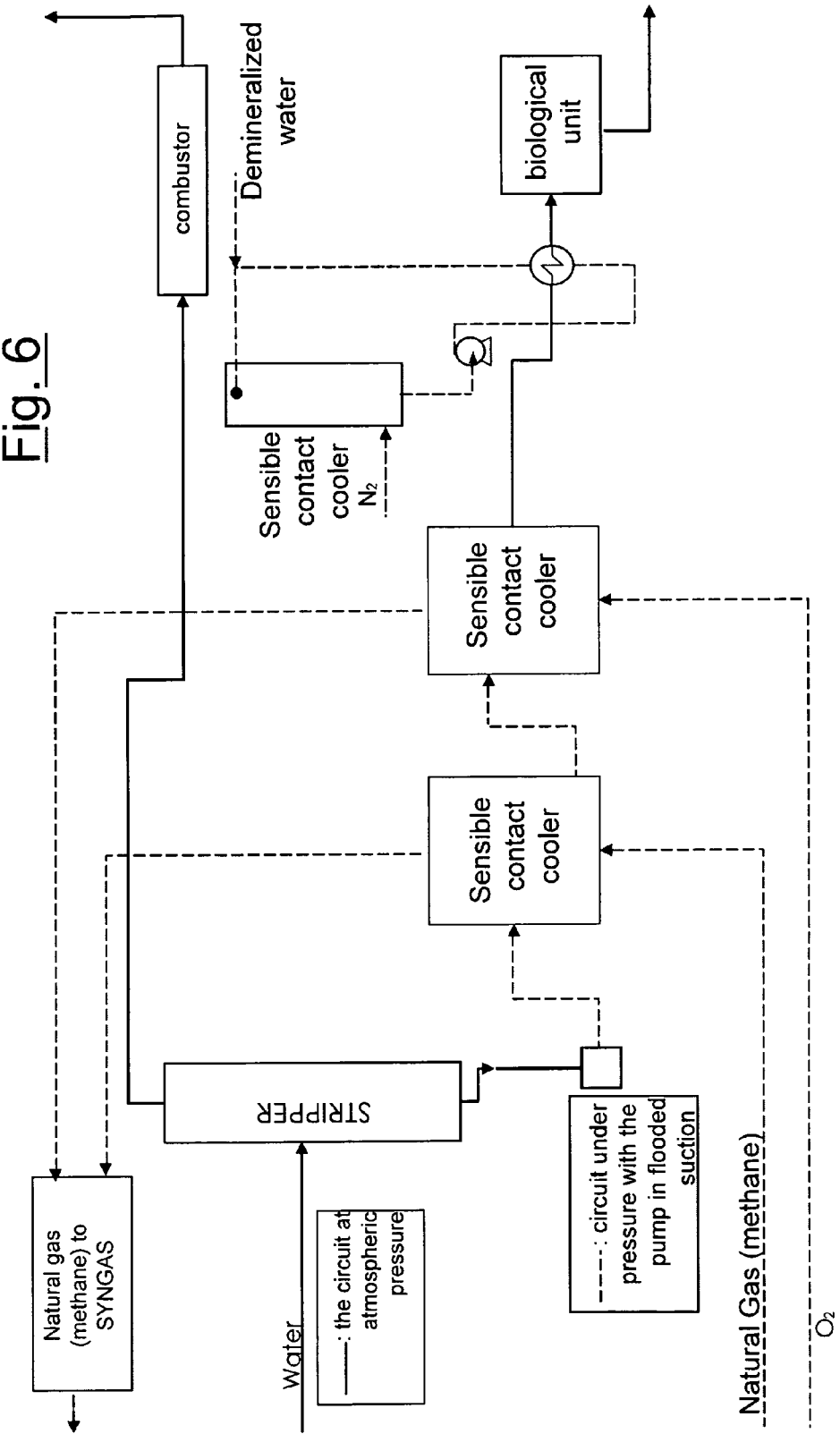
FIG. 6 shows a variant of a plant scheme with two or more sensible contact heat exchange units in series.

Plant Scheme with Two or More Sensible Contact Heat Exchange Units in Parallel (FIG. 3)

A further variant of the process using sensible contact heat exchangers which can have the advantage of keeping the gas flows separate, let us use two flows, for example: the flow of natural gas is separated from the oxidizing stream until they are rejoined in the synthesis reactor for the preparation of Syngas (U.S. Pat. No. 5,645,613). In this case, the aqueous stream is partialized at the outlet of the manifold of the pump (5) and sent into two streams with a different flow-rate proportionally to the flow-rate of the gases passing through them. The advantages are a reduction in the temperature to below 38-36° C., a reduction in the dissolved oxygen of two thirds, no transfer by contact with water of methane into the oxygen stream. At the outlet of the respective exchangers, the stream is sent again to subsequent treatment (9).

EXAMPLE 1

The set of pumps with the impellers immersed in a well at a height less than 7 m referring to the column bottom of the stripper, receive a water flow having a flow-rate equal to about 290 kg/h at a temperature equal to 101.4° C. referring to a pressure corresponding to 1,030 hPa. The pumps relaunch the water under pressure to a value of 45 bar revealed at the inlet of the sensible contact heat exchanger. The flow of methane gas is sent from below at a flow-rate equal to 325 kg/h at a temperature of about 25° C. and a pressure equal to that of the water inlet pressure.

The exchanger is made for reaching performances equivalent to 5 theoretical thermodynamic steps, in fact, an inlet temperature equal to 105° C. of the pressurized water corresponds to an outlet temperature equal to 40° C., bearing in mind that there is no insulation.

The composition data indicated for the water at the inlet of the exchanger show a C.O.D. at the inlet equal to 3,100 (a total weight percentage with respect to the feed of 0.225% of oxygenated organic compounds); at the outlet, the water has a C.O.D.=2,950 (the reduction in organic compounds in the water at the outlet is 15% with respect to the total), in spite of the fact that the flow-rate has been reduced by 7 kg/h which is added to the outgoing gaseous stream. The gas at the outlet of the exchanger has a temperature equal to 90.5° C. with a flow-rate of 332 kg/h.

The invention claimed is:

1. A process for the purification of an aqueous stream coming from the Fischer-Tropsch reaction which comprises:
    feeding the aqueous stream containing organic by-products of the reaction to a fractionating distillation column or to a stripping column;
    condensation of the vaporized stream leaving the head of the column and the removal of a distillate enriched in the heaviest by-products;
    feeding the partially purified aqueous stream leaving the bottom of the distillation column, at the head to one or more sensible contact exchangers;
    sending a process gas in countercurrent to the tail of the exchanger at a temperature lower than that of the aqueous stream;
    sending the process gas enriched in water and part of the organic residue leaving the head of the exchanger to the Fischer-Tropsch synthesis plant of hydrocarbons;
    sending the purified colder water leaving the exchanger directly to further treatment.

2. The process according to claim 1, wherein the process gas can consist of natural gas, oxygen, nitrogen, or air.

3. The process according to claim 1, wherein the sensible contact exchangers can be arranged in series, in parallel or also have a mixed configuration between connections in series and in parallel.

4. The process according to claim 1, wherein the partially purified aqueous stream leaving the bottom of the column is sent to a well in contact with the impeller of a pump suitably immersed and placed in a flooded suction position, to exert the necessary pressure on the water at the inlet of the subsequent unit working under pressure.

5. The process according to claim 1, wherein the aqueous stream leaving the bottom of the distillation column has a content of oxygenated organic compounds lower than 10,000 ppm.

6. The process according to claim 5, wherein the aqueous stream leaving the bottom of the distillation column has a content of oxygenated organic compounds within the range of 1,000-5,000 ppm.

7. The process according to claim 1, wherein the distillation or stripping column works at atmospheric pressure.

8. The process according to claim 1, wherein the sensible contact exchanger is analogous to a filling column in which the filling can be of the non-structured type, structured type or channeled spray type.

9. The process according to claim 1, wherein the process gas leaving the head of the sensible contact exchanger has a temperature ranging from 70 to 80° C. and the water at the outlet of the exchanger has a temperature higher than 20° C.

10. The process according to claim 9, wherein the water at the outlet of the exchanger has a temperature ranging from 30 to 45° C.

11. The process according to claim 1, wherein the water at the outlet of the exchanger is further cooled in an exchanger which connects the outgoing water circuit with the circuit of a cooling fluid coming from a sensible contact exchanger in which there has been a partial expansion of the gas introduced.

12. The process according to claim 11, wherein the gas introduced into the exchanger is selected from those present in the process or nitrogen.

* * * * *